United States Patent
Sasaki et al.

(10) Patent No.: US 11,732,439 B2
(45) Date of Patent: Aug. 22, 2023

(54) REMOTE CONTROL SYSTEM AND MAIN CONTROL DEVICE

(71) Applicant: KOBELCO CONSTRUCTION MACHINERY CO., LTD., Hiroshima (JP)

(72) Inventors: Hitoshi Sasaki, Hiroshima (JP); Seiji Saiki, Hiroshima (JP); Kazuhiro Ueda, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 519 days.

(21) Appl. No.: 16/980,664

(22) PCT Filed: Jan. 24, 2019

(86) PCT No.: PCT/JP2019/002333
§ 371 (c)(1),
(2) Date: Sep. 14, 2020

(87) PCT Pub. No.: WO2019/187565
PCT Pub. Date: Oct. 3, 2019

(65) Prior Publication Data
US 2021/0025131 A1    Jan. 28, 2021

(30) Foreign Application Priority Data
Mar. 28, 2018   (JP) .................. 2018-062609

(51) Int. Cl.
*E02F 9/20*    (2006.01)
*E02F 9/26*    (2006.01)
(Continued)

(52) U.S. Cl.
CPC .............. *E02F 9/205* (2013.01); *E02F 9/261* (2013.01); *E02F 9/264* (2013.01); *G05D 1/0016* (2013.01);
(Continued)

(58) Field of Classification Search
CPC .... B60R 1/00; E02F 3/435; E02F 9/20; E02F 9/205; E02F 9/2062; E02F 9/26;
(Continued)

(56) References Cited

U.S. PATENT DOCUMENTS 6,778,097 B1 * 8/2004 Kajita ..................... E02F 3/437
342/426
10,794,047 B2 * 10/2020 Arimatsu ................ E02F 9/261
(Continued)

FOREIGN PATENT DOCUMENTS

| CN | 101945740 A | 1/2011 |
| CN | 102947515 A | 2/2013 |

(Continued)

OTHER PUBLICATIONS

Combined Chinese Office Action and Search Report dated Dec. 3, 2021 in corresponding Chinese Patent Application No. 201980019466.7 (with English Translation and English Translation of Category of Cited Documents), 14 pages.
(Continued)

*Primary Examiner* — Tyler J Lee
(74) *Attorney, Agent, or Firm* — Oblon, McClelland, Maier & Neustadt, L.L.P.

(57) ABSTRACT

A master acquires, from a slave, a surrounding image obtained by capturing an image of surroundings of a construction machine from inside a cab seat of the construction machine, determines whether or not a working device is included in the surrounding image, and in a case of determining that the working device is not included in the
(Continued)

surrounding image, calculates a position of the working device from a posture of the construction machine and displays, on a display device, a display object for informing an operator of the calculated position, together with the surrounding image.

16 Claims, 7 Drawing Sheets

(51) Int. Cl.
  *G05D 1/00* (2006.01)
  *H04N 7/18* (2006.01)
  *G06V 20/56* (2022.01)
  *E02F 3/43* (2006.01)

(52) U.S. Cl.
  CPC .......... *G05D 1/0038* (2013.01); *G06V 20/56* (2022.01); *H04N 7/185* (2013.01); *E02F 3/435* (2013.01)

(58) Field of Classification Search
  CPC ........ E02F 9/261; E02F 9/264; G05D 1/0016; G05D 1/0038; G06V 20/56; H04N 7/18; H04N 7/185
  See application file for complete search history.

(56) References Cited

U.S. PATENT DOCUMENTS

| | | | |
|---|---|---|---|
| 2016/0224026 A1* | 8/2016 | Hamada | ................ E02F 9/2004 |
| 2017/0016211 A1* | 1/2017 | Arimatsu | ................ G01S 19/14 |
| 2018/0051446 A1 | 2/2018 | Yoshinada et al. | |

FOREIGN PATENT DOCUMENTS

| | | |
|---|---|---|
| CN | 103608150 A | 2/2014 |
| CN | 105759839 A | 7/2016 |
| CN | 106961546 A | 7/2017 |
| CN | 107000829 A | 8/2017 |
| JP | 6-17444 A | 1/1994 |
| JP | 10-252101 A | 9/1998 |
| JP | 2012-107395 A | 6/2012 |
| JP | 2013-113044 A | 6/2013 |
| JP | 2016-106192 A | 6/2016 |
| JP | 2016-160741 A | 9/2016 |

OTHER PUBLICATIONS

International Search Report dated Apr. 16, 2019 in PCT/JP2019/002333 filed on Jan. 24, 2019, 1 page.
Extended European Search Report dated Mar. 23, 2021 in European Patent Application No. 19777489.6, 6 pages.

* cited by examiner

| | DISPLAY OBJECT |
|---|---|
| OA | TWO-DIMENSIONAL ARROW IMAGE |
| OB | THREE-DIMENSIONAL ARROW IMAGE |
| OC | CONSTRUCTION MACHINE IMAGE |
| OD | WORKING DEVICE IMAGE |

FIG. 5

| | RELATED TO DISPLAY | OPERATION OF CONTROL LEVER | POSITION OF WORKING DEVICE | ELAPSED TIME OF NON-OPERATION | STATE OF SYSTEM | DECELERATING FUNCTION | CUTOFF LEVER |
|---|---|---|---|---|---|---|---|
| 1 | NOT TO DISPLAY | PRESENT | - | - | DURING COMMUNICATION | - | - |
| 2 | NOT TO DISPLAY | ABSENT | WITHIN SCREEN | - | DURING COMMUNICATION | - | - |
| 3 | NOT TO DISPLAY | ABSENT | OUTSIDE SCREEN | WITHIN FIXED TIME PERIOD | DURING COMMUNICATION | - | - |
| 4 | DISPLAY | ABSENT | OUTSIDE SCREEN | AFTER LAPSE OF FIXED TIME PERIOD | DURING COMMUNICATION | - | - |
| 5 | DISPLAY | - | OUTSIDE SCREEN | - | COMMUNICATION START | - | - |
| 6 | DISPLAY | - | OUTSIDE SCREEN | - | DURING COMMUNICATION | - | LOCKED |
| 7 | DISPLAY | - | OUTSIDE SCREEN | - | DURING COMMUNICATION | IN OPERATION | - |

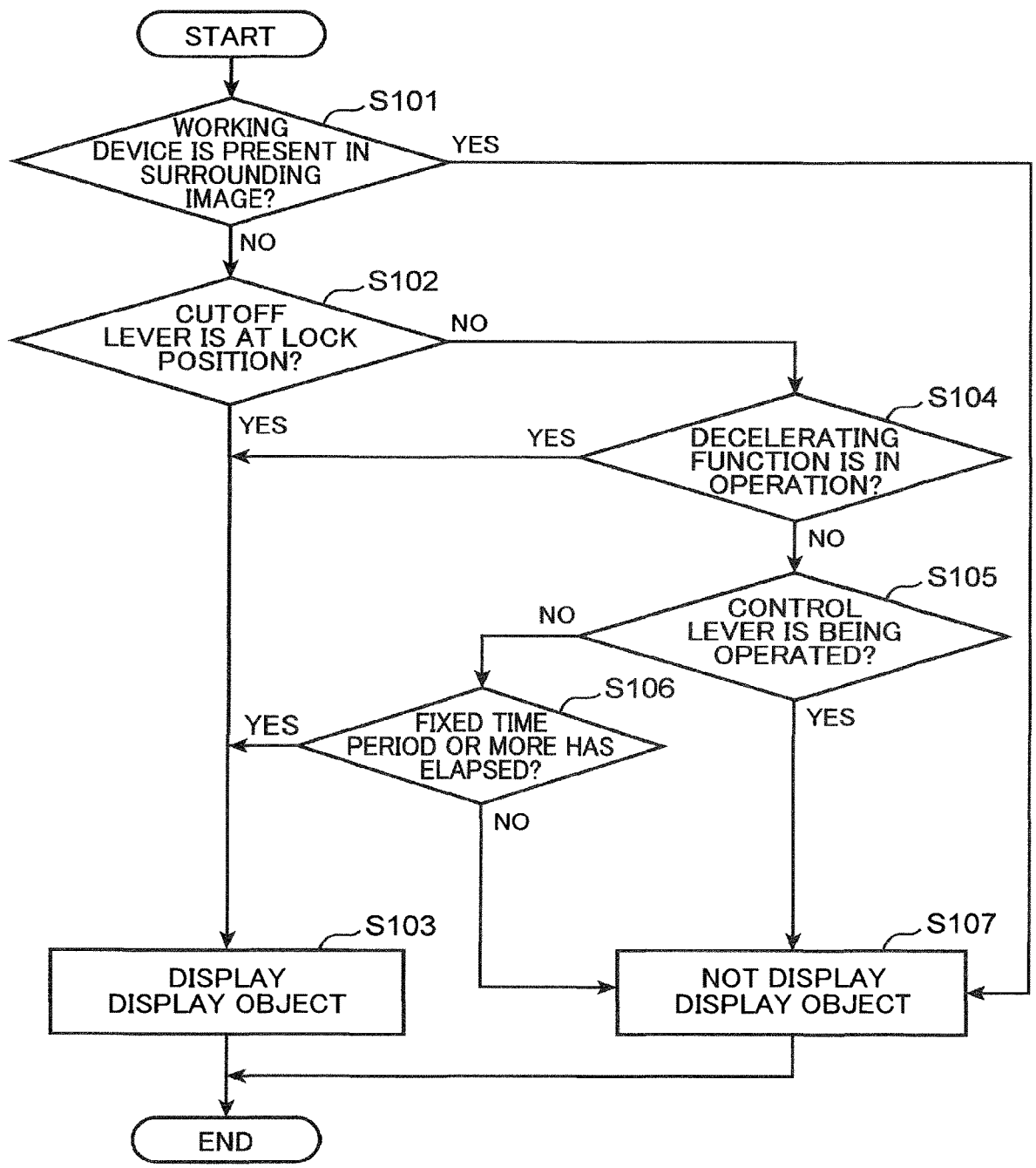

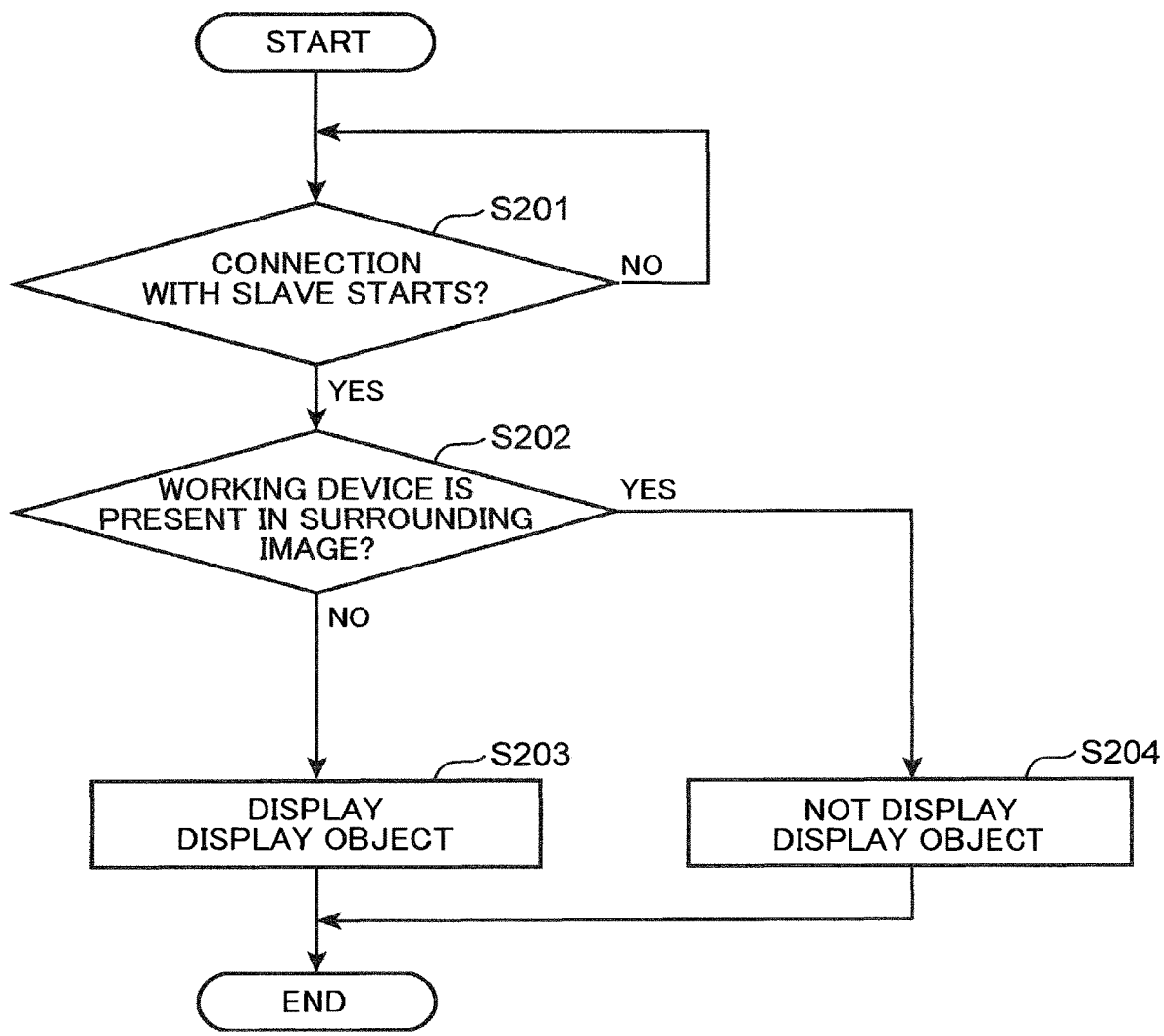

REMOTE CONTROL SYSTEM AND MAIN CONTROL DEVICE

TECHNICAL FIELD

The present invention relates to a remote control system provided with a main control device and a slave control device, and the like.

BACKGROUND ART

In recent years, there is provided a known remote control system which remotely controls a construction machine by using a main control device called a master which directly accepts operation of an operator and a slave control device called a slave which is communicably connected to the master (see e.g. Patent Literature 1).

In such a remote control system, a surrounding image of a construction machine captured by a camera provided in a cab seat of the construction machine is displayed on a display device provided in a master, and an operator remotely controls a working device (a boom, an arm, a bucket, and the like) of the construction machine while looking at the surrounding image displayed on the display device.

Among prior art literature related to the present application is Patent Literature 2 in addition to Patent Literature 1. Patent Literature 2 discloses a technique of detecting a relative angle of a lower travelling body with respect to an upper slewing body from an image captured by a rear surveillance camera provided in the rear of a construction machine and displaying an image showing the detected relative angle on a display device provided in a cab seat.

However, some posture that a working device can assume might bring about a situation where the working device is positioned outside a field of view of a camera provided in a cab seat. In this case, there occurs a problem that the working device disappears from a surrounding image displayed on a display device of a master, so that an operator of the master cannot check in which direction the working device is currently positioned, resulting in making the operator feel uneasy.

In particular, in a case of resuming remote control of a construction machine after a break for lunch etc., unless a working device appears in a surrounding image, an operator is required to carefully operate the working device while predicting a position of the working device, resulting in increasing an operation load.

Since Patent Literature 2 described above is not an invention related to a remote control system from the beginning and does not disclose disposing a camera inside a cab seat either, the above problem cannot be solved, the problem occurring when a working device disappears from a surrounding image displayed on a display screen of a master.

CITATION LIST

Patent Literature

Patent Literature 1: JPH10-252101 A
Patent Literature 2: JP 2012-107395 A

SUMMARY OF INVENTION

An object of the present invention is to provide a remote control system and the like capable of allowing an operator of a main control device to recognize a position of a working device even when the working device disappears from a surrounding image displayed on a display device of the main control device.

One aspect of the present invention is a remote control system which remotely controls a construction machine including a working device, the remote control system including: a main control device for remotely controlling the construction machine; and a slave control device which is mounted on the construction machine and controls the working device based on operation accepted by the main control device, in which the slave control device includes: a camera which acquires a surrounding image obtained by capturing an image of surroundings of the construction machine from inside a cab seat of the construction machine; a posture detecting unit which detects a posture of the working device; and a first communication unit which transmits to the main control device the surrounding image and posture information indicating the posture of the working device detected by the posture detecting unit, and the main control device includes: a control member which accepts operation of an operator; a second communication unit which receives the surrounding image and the posture information transmitted from the slave control device; a display device which displays a display screen including the surrounding image received by the second communication unit; a determination unit which determines whether or not the working device is included in the surrounding image received by the second communication unit; and a display control unit which, in a case where the determination unit determines that the working device is not included in the surrounding image, calculates a position of the working device from the posture information received by the second communication unit and displays, on the display screen, a display object for informing the operator of the calculated position.

According to the present invention, an operator of a main control device can recognize a position of a working device even when the working device disappears from a surrounding image displayed on a display device of the main control device.

BRIEF DESCRIPTION OF DRAWINGS

FIG. 5 is a table summarizing display/non-display timing of a display object according to the present embodiment.

FIG. 6 is a flow chart showing one example of processing of the remote control system according to the embodiment of the present invention.

FIG. 7 is a flow chart showing one example of processing of the remote control system according to the embodiment of the present invention at the start of communication.

DESCRIPTION OF EMBODIMENT

Figure 1:
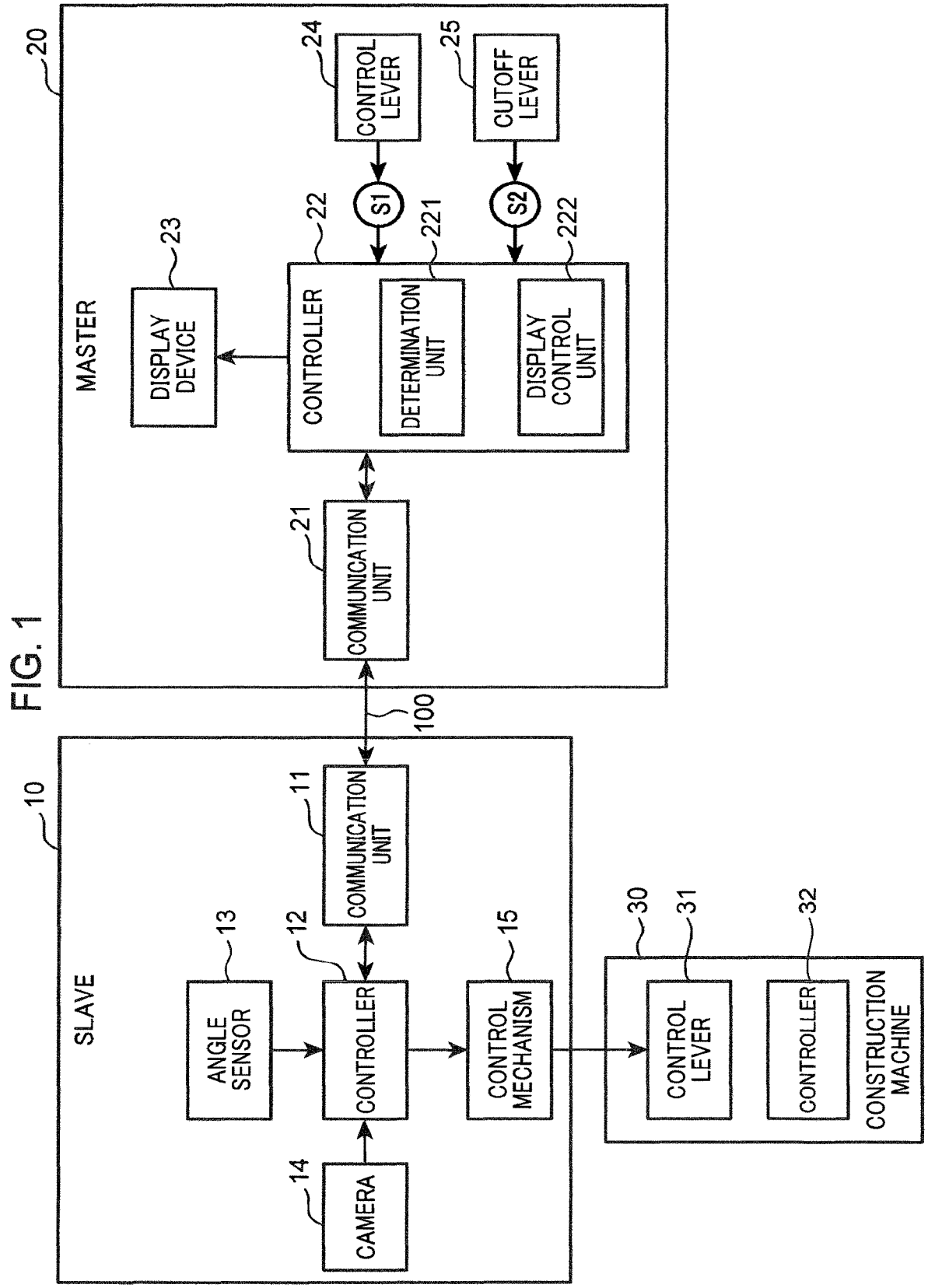
FIG. 1 is a block diagram showing an overall configuration of a remote control system according to an embodiment of the present invention.

FIG. 1 is a block diagram showing an overall configuration of a remote control system according to an embodiment of the present invention. The remote control system is provided with a slave 10 and a master 20. The slave 10 is a slave control device which is arranged in a cab seat of a construction machine 30 to directly operate a control lever 31 of the construction machine 30 based on an amount of operation accepted by the master 20. The slave 10 is a machine which serves as a so-called dummy of an operator to control the construction machine 30. The master 20 is a main control device which directly accepts operation of an operator of the construction machine 30 to remotely control the construction machine 30. In the present embodiment, the master 20, which is configured with a control device that imitates the cab seat of the construction machine 30, has a control lever 24 which is similar to the control lever 31 of the construction machine 30 and is arranged at a position similar to that in the construction machine 30. The master 20 is also provided with a seat on which an operator is seated.

The slave 10 and the master 20 are communicably connected with each other via a communication path 100. As the communication path 100, there are adopted communication paths such as specific power-saving wireless communication and Bluetooth (registered trademark) which enable the slave 10 and the master 20 to communicate at a distance of about several tens to several hundreds of meters by wireless communication. This is one example only and as the communication path 100, public communication lines including a cellular phone communication network, an Internet communication network, and the like may be adopted. In this case, the master 20 and the slave 10 are allowed to conduct long-distance communication.

Figure 2:
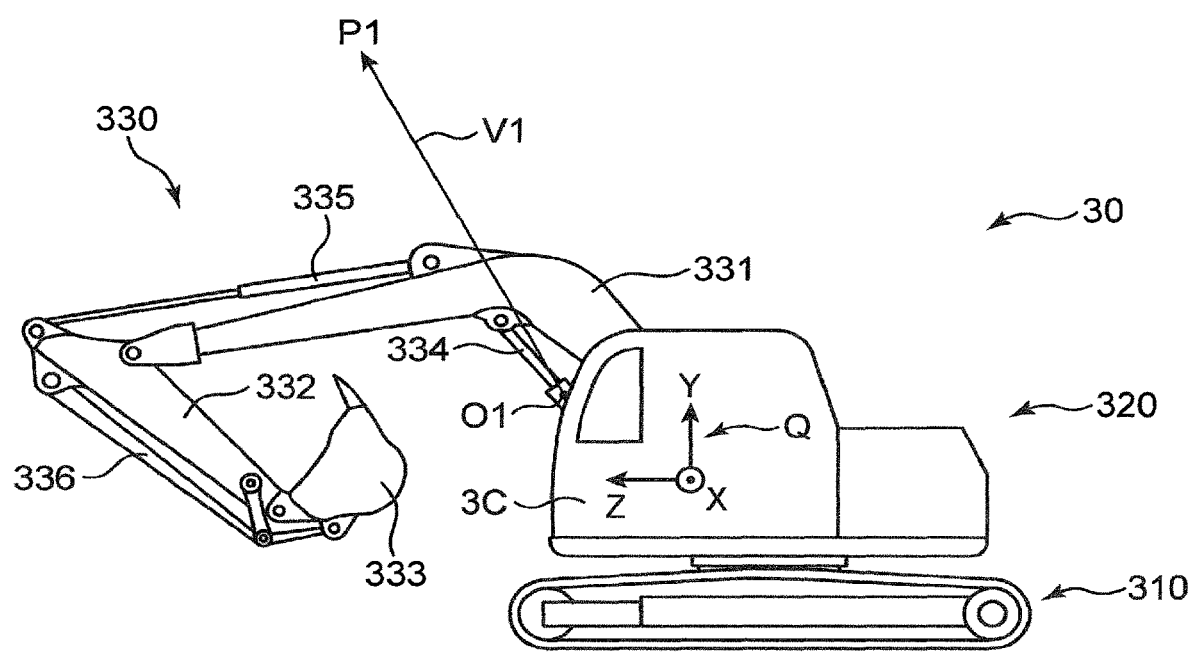
FIG. 2 is a view showing an outer appearance of a construction machine shown in FIG. 1.

FIG. 2 is a view showing an outer appearance of the construction machine 30 shown in FIG. 1. The construction machine 30 shown in FIG. 2 is configured with a hydraulic excavator. The construction machine 30 is provided with a crawler type lower travelling body 310, an upper slewing body 320 slewably provided on the lower travelling body 310, and a working device 330 attached to the upper slewing body 320.

The working device 330 is provided with a boom 331 attached to the upper slewing body 320 so as to be raised and lowered, an arm 332 swingably attached to a front end portion of the boom 331, and an attachment 333 swingably attached to a front end portion of the arm 332.

The working device 330 is also provided with a boom cylinder 334 which raises and lowers the boom 331 with respect to the upper slewing body 320, an arm cylinder 335 which causes the arm 332 to swing with respect to the boom 331, and an attachment cylinder 336 which causes the attachment 333 to swing with respect to the arm 332. The upper slewing body 320 is provided with a cab seat 3C on which an operator boards.

Reference will be returned to FIG. 1. The master 20 is provided with a communication unit 21 (one example of a second communication unit), a controller 22, a display device 23, a control lever 24 (one example of a control member), a cutoff lever 25, and sensors S1 and S2.

The communication unit 21, which is configured with a communication device adapted to a communication method employed by the communication path 100, receives a surrounding image of the construction machine 30 and posture information indicating a posture of the working device 330 transmitted from the slave 10. Posture information of the working device 330 includes, for example, a detection value of an angle sensor 13. The communication unit 21 also transmits an amount of operation accepted by the control lever 24 of the master 20 to the slave 10.

The controller 22 is configured with a computer including a processor such as CPU or ASIC and storage devices such as ROM and RAM. The controller 22 is provided with a determination unit 221 and a display control unit 222. The determination unit 221 and the display control unit 222 may be realized by execution of a control program by a processor or configured with a dedicated hardware circuit.

The determination unit 221 determines whether or not the working device 330 is included in a surrounding image received by the communication unit 21. Here, the determination unit 221 may determine whether or not the working device 330 is included in a surrounding image by applying, to the surrounding image, template matching using a template image of the working device 330 which is stored in a storage device in advance. Alternatively, the determination unit 221 may determine whether or not the working device 330 is included in a surrounding image by referring to a determination table which is stored in the storage device and in which a detection value of the angle sensor 13 included in posture information transmitted from the slave 10 and a determination result as to whether or not the working device 330 is included in a surrounding image are associated with each other in advance.

The display control unit 222 causes the display device 23 to display a surrounding image received by the communication unit 21 from the slave 10. In a case where the determination unit 221 determines that the working device 330 is not included in a surrounding image, the display control unit 222 calculates a position of the working device 330 from posture information received by the communication unit 21 and displays, on the display device 23, a display object for informing an operator of the calculated position together with the surrounding image.

The display device 23 is configured with a display device such as a liquid crystal display, an organic EL display, or the like provided ahead of a seat of the master 20 and displays a surrounding image received by the communication unit 21 from the slave 10. The display device 23 also causes a display object to be displayed or not to be displayed under the control of the display control unit 222. An operator of the master 20 remotely controls the construction machine 30 while looking at a surrounding image displayed on the display device 23.

The control lever 24, which corresponds to the control lever 31 provided in the construction machine 30, accepts operation from an operator which remotely controls the construction machine 30. In the present embodiment, the control lever 24 will be described as a control lever which accepts operation of an operator for operating the working device 330 of the construction machine 30. For example, the control lever 24 may be configured with an ATT (attachment) lever capable of being inclined in four directions of front, rear, left, and right, i.e., when inclined forward, the control lever 24 lowers the boom 331, when inclined backward, raises the boom 331, when inclined leftward, causes the attachment 333 to swing to a driver seat side, and when inclined rightward, causes the attachment 333 to swing from the driver seat to the opposite side. Alternatively, the control lever 24 may be configured with a travelling lever which causes the construction machine 30 to advance or retract. Alternatively, the control lever 24 may be configured with a slewing lever which is capable of being inclined in four directions of front, rear, left, and right and causes the arm 332 to swing and causes the upper slewing body 320 to slew. Alternatively, the control lever 24 may be configured with three control levers of an ATT lever, a travelling lever, and a slewing lever. In any case, the control lever 24 is provided with various kinds of control levers so as to correspond to various kinds of control levers provided in the control lever 31 of the construction machine 30.

The sensor S1, which is configured with, for example, a potentiometric sensor, detects an amount of operation of the control lever 24 and outputs the detected amount of operation to the controller 22. Here, the sensor S1 individually detects amounts of operation of the control lever 24 in the front, rear, left, and right directions, and outputs the detected amounts of operation to the controller 22. The sensor S1 increases an amount of operation to be detected as an inclination amount of the control lever 24 is increased in each of the front, rear, left, and right directions. In a case where the control lever 24 is configured with a plurality of control levers, the sensor S1 is configured with a plurality of sensors corresponding to the respective control levers.

The cutoff lever 25, which is configured with a control lever capable of being inclined between a lock position and a release position, accepts operation from an operator for cutting off operation of the control lever 24. When the cutoff lever 25 is positioned at the lock position, the controller 22 cuts off the operation of the control lever 24 by causing the working device 330 to maintain its posture as it is. On the other hand, when the cutoff lever 25 is positioned at the release position, the controller 22 causes the working device 330 to release the maintained posture and activates the working device 330 according to the operation of the control lever 24.

The sensor S2 is a sensor which detects the cutoff lever 25 being positioned at the lock position or being positioned at the release position.

The slave 10 is provided with a communication unit 11 (one example of a first communication unit), a controller 12, the angle sensor 13 (one example of a posture detecting unit), a camera 14, and a control mechanism 15.

The communication unit 11, which is configured with a communication device adapted to a communication method employed by the communication path 100, transmits a surrounding image acquired by the camera 14 and posture information of the working device 330 to the master 20. The communication unit 11 also receives, from the master 20, an amount of operation of the control lever 24 accepted by the master 20.

The controller 12 is configured with a computer including a processor such as CPU or ASIC and storage devices such as ROM and RAM. In a case where communication connection between the master 20 and the slave 10 is established, the controller 12 controls the communication unit 11 so that a surrounding image acquired by the camera 14 and posture information of the working device 330 are periodically transmitted to the master 20 in a predetermined sampling cycle.

The angle sensor 13 is configured with, for example, a resolver or potentiometric sensor and detects a posture of the working device 330. The angle sensor 13 is configured with a boom sensor which detects an angle (boom angle) of the boom 331 relative to the upper slewing body 320, an arm sensor which detects an angle (arm angle) of the arm 332 relative to the boom 331, an attachment sensor which detects an angle (attachment angle) of the attachment 333 relative to the arm 332, and a slewing sensor which detects a slew angle of the upper slewing body 320 relative to the lower travelling body 310.

Accordingly, the display control unit 222 of the master 20 only needs to calculate a front end position of the attachment 333 using each detection value of the boom sensor, the arm sensor, and the attachment sensor and each known length of the boom 331, the arm 332, and the attachment 333 and calculate the calculated front end position as a position of the working device 330. Then, the display control unit 222 only needs to calculate a position of the working device 330 by plotting the front end position of the attachment 333 on a three-dimensional local coordinate space Q (FIG. 2) of the construction machine 30, the local coordinate space being centered around, e.g., a position of the center of gravity of the construction machine 30.

The control mechanism 15, which is configured with an actuator, receives input of a control signal for generating operating force according to an amount of operation received by the communication unit 11, generates operating force according to the amount of operation, and applies the operating force to the control lever 31 of the construction machine 30. For example, assuming that the control lever 31 is configured with an ATT lever, a travelling lever, and a slewing lever, the control mechanism 15 is configured with three control mechanisms corresponding to the respective control levers. Additionally, in this example, in a case where the ATT lever is configured with a control lever capable of being inclined in four directions of front, rear, left, and right, the control mechanism 15 is provided with an actuator which causes the ATT lever to be inclined in the front-rear direction and an actuator which causes the ATT lever to be inclined in the left-right direction.

The camera 14, which is configured with, for example, a CMOS sensor or a CCD sensor, acquires a surrounding image indicating surroundings of the construction machine 30 by periodically capturing an image of the surroundings of the construction machine 30 from inside the cab seat 3C in a predetermined sampling cycle. Here, the camera 14, which is attached inside the cab seat 3C so as to have a line of sight faced ahead of the cab seat 3C, captures an image of the surroundings of the construction machine 30 through a front glass which blocks the front side of the cab seat 3C. Specifically, assuming that an operator is seated on a seat of the cab seat 3C, the camera 14 captures a scene seen by the operator through the front glass.

In a case where the communication unit 11 receives an amount of operation of the control lever 24, the controller 12 outputs a control signal according to the amount of operation to the control mechanism 15. As a result, the slave 10 becomes a dummy of an operator who operates the master 20 to directly control the construction machine 30.

The construction machine 30 is provided with the control lever 31 (one example of the control member) and a controller 32. The control lever 31 is provided in the cab seat 3C of the construction machine 30 and is inclined by the application of operating force from the control mechanism 15 of the slave 10. The control lever 31 is configured with at least one or a plurality of the ATT lever, the travelling lever, and the slewing lever similarly to the control lever 24 of the master 20. In this case, at least one or a plurality of the ATT lever and the slewing lever constituting the control lever 31 are configured with a control lever capable of being inclined in four directions of front, rear, left, and right similarly to the ATT lever and the slewing lever constituting the control lever 24 of the master 20. The travelling lever constituting the control lever 31 is configured with a control lever capable of being inclined in two directions of front and rear similarly to the travelling lever constituting the control lever 24 of the master 20.

In a case where the control lever 31 has not been operated for a fixed time period, the controller 32 causes a decelerating function of bringing an engine of the construction machine 30 into an idle state to start.

Figure 3:
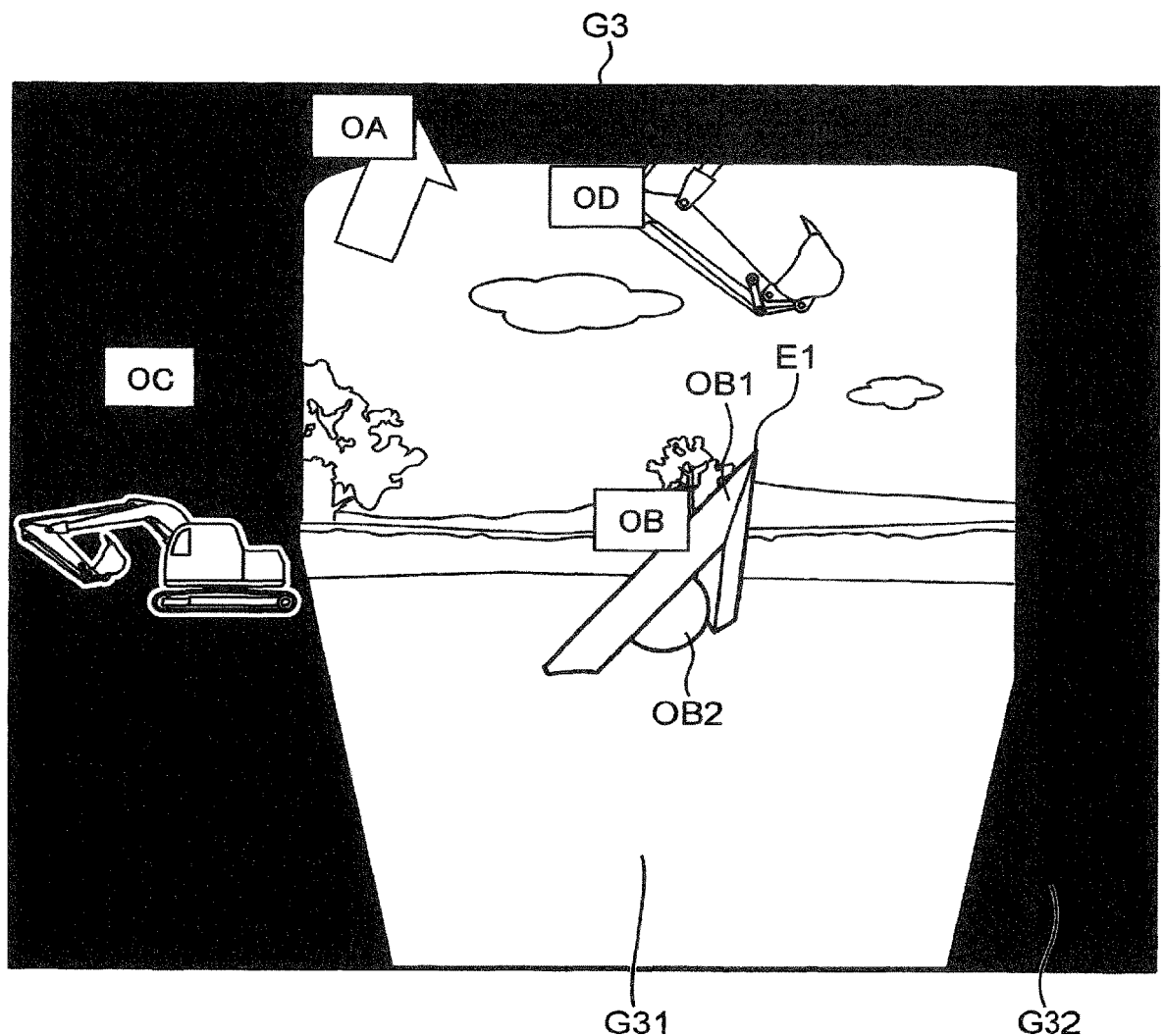
FIG. 3 is a diagram showing one example of a display screen displayed on a display device of a master.

FIG. 3 is a diagram showing one example of a display screen G3 displayed on the display device 23 of the master 20. The display screen G3 is provided with a surrounding image G31 and a margin area G32 covering the surroundings of the surrounding image G31. In the example shown in FIG. 3, the surrounding image G31 has an outer frame shape configured to be a rectangular shape having a lateral width gradually reduced toward the lower side, the outer frame shape imitating a shape of the front glass of the cab seat 3C.

The table shown in the upper part of FIG. 3 is a table summarizing kinds of display objects used in the present embodiment. In the present embodiment, as a display object, one of a two-dimensional arrow image OA, a three-dimensional arrow image OB, a construction machine image OC, and a working device image OD is adopted.

The two-dimensional arrow image OA is an arrow-shaped image which two-dimensionally shows the front end position of the attachment 333 of the working device 330 relative to the cab seat 3C. With reference to FIG. 2, the local coordinate space Q of the working device 330 has an origin set at, for example, the center of gravity of the construction machine 30 and has a Y-axis in a height direction, an X-axis in the left-right direction, and a Z-axis in the front-rear direction. The X-axis, the Y-axis, and the Z-axis are perpendicular to each other.

In FIG. 2, in a case where the front end position of the attachment 333 is at a point P1, the display control unit 222 calculates a three-dimensional vector V1 directed from a predetermined reference position O1 in the local coordinate space Q toward the point P1. Then, the display control unit 222 obtains a projection vector of the three-dimensional vector V1 to an XY plane parallel to a front surface of the cab seat 3C and generates an arrow-shaped image directed to the same direction as the obtained projection vector and having a predetermined length as the two-dimensional arrow image OA. Then, the display control unit 222 displays the two-dimensional arrow image OA at a predetermined display position on the display screen G3. As the reference position O1, a position on the local coordinate space Q is adopted which corresponds to the display position of the two-dimensional arrow image OA on the display screen G3. In FIG. 3, a predetermined position at an upper left part of the surrounding image G31 is assumed to be the display position of the two-dimensional arrow image OA. Therefore, in this case, for example, an X coordinate and a Y coordinate of the local coordinate space Q corresponding to this display position are adopted as an X component and a Y component of the reference position O1 and for example, a coordinate of the front glass is adopted as a Z component of the reference position O1.

The three-dimensional arrow image OB is an arrow-shaped image three-dimensionally showing, to the cab seat 3C, the front end position of the attachment 233 of the working device 330. Here, the three-dimensional arrow image OB is an image obtained by cutting two triangular poles extending obliquely at an acute angle to the respective longitudinal directions and projecting a three-dimensional model on a virtual screen, the three-dimensional model including wedge-shaped wedge portions OB1 formed of bonded sections and a spherical portion OB2 sandwiched between the wedge portions OB1, in which a posture of a front end E1 of the wedge portion OB1 indicates a direction of the working device 330. The virtual screen is set, for example, at a position within the local coordinate space Q corresponding to the front glass of the cab seat 3C.

Similarly to the case of the two-dimensional arrow image OA, the display control unit 222 obtains the three-dimensional vector V1 and arranges a three-dimensional model at the reference position O1 so that the front end E1 of the three-dimensional model of the three-dimensional arrow image OB faces an end point (the point P1) of the three-dimensional vector V1. Then, the display control unit 222 generates the three-dimensional arrow image OB by projecting the arranged three-dimensional model on the virtual screen and displays the generated image on the display screen G3. In the example shown in FIG. 3, since a center position of the surrounding image G31 is assumed to be the display position of the three-dimensional arrow image OB, for example, the X coordinate and the Y coordinate of the local coordinate space Q corresponding to an X component and a Y component of the center position are adopted as the X component and the Y component of the reference position O1 and for example, a Z coordinate of the local coordinate space Q spaced apart ahead of the front glass by a predetermined distance is adopted as the Z component.

In a case where the two-dimensional arrow image OA or the three-dimensional arrow image OB is adopted, the display control unit 222 may display the two-dimensional arrow image OA or the three-dimensional arrow image OB in a larger size as the front end position of the attachment 333 of the working device 330 comes closer to the cab seat 3C. In this case, the display control unit 222 prepares in advance a table or a function which defines a relationship between a norm of the three-dimensional vector V1 and a magnification ratio such that the smaller a norm of the three-dimensional vector V1 becomes, the more the magnification ratio is increased, and determines a magnification ratio corresponding to a size of the three-dimensional vector V1 by using the table or the function. Then, the display control unit 222 only needs to magnify the two-dimensional arrow image OA or the three-dimensional model of the three-dimensional arrow image OB by multiplying the two-dimensional arrow image OA having a default size or a three-dimensional model of the three-dimensional arrow image OB by the determined magnification ratio. The magnification ratio has a value of 0 or more, and in a case of 1 or less, the two-dimensional arrow image OA or the three-dimensional arrow image OB will be reduced in size.

With reference to FIG. 3, the construction machine image OC is an image imitating an actual posture of the construction machine 30 in a side view. The display control unit 222 generates the construction machine image OC by modifying an image of the construction machine 30 with a default posture in a side view by using a boom angle, an arm angle, an attachment angle, and a slew angle included in a detection value of the angle sensor 13. Then, the display control unit 222 displays the generated construction machine image OC at a predetermined display position on the display screen G3. In the example shown in FIG. 3, the construction machine image OC is displayed at a center left position in the margin area G32. As a default posture, for example, a posture can be adopted in which the lower travelling body 310 and the upper slewing body 320 both face to the front, and the boom angle, the arm angle, and the attachment angle are their predetermined default angles, respectively.

The working device image OD is an image indicating a current posture of the working device 330 relative to the upper slewing body 320. The display control unit 222 is provided in advance with a working device image table in which the working device image OD corresponding to an posture of the working device 330 is registered so as to be associated with a boom angle, an arm angle, and an attachment angle. Then, the display control unit 222 only needs to read, from the working device image table, the working device image OD corresponding to a combination of a boom angle, an arm angle, and an attachment angle included in a detection value of the angle sensor 13, and display the working device image OD at a predetermined position on the display screen G3. In the example shown in FIG. 3, the working device image OD is displayed at the center of an upper part of the surrounding image G31.

Figure 4:
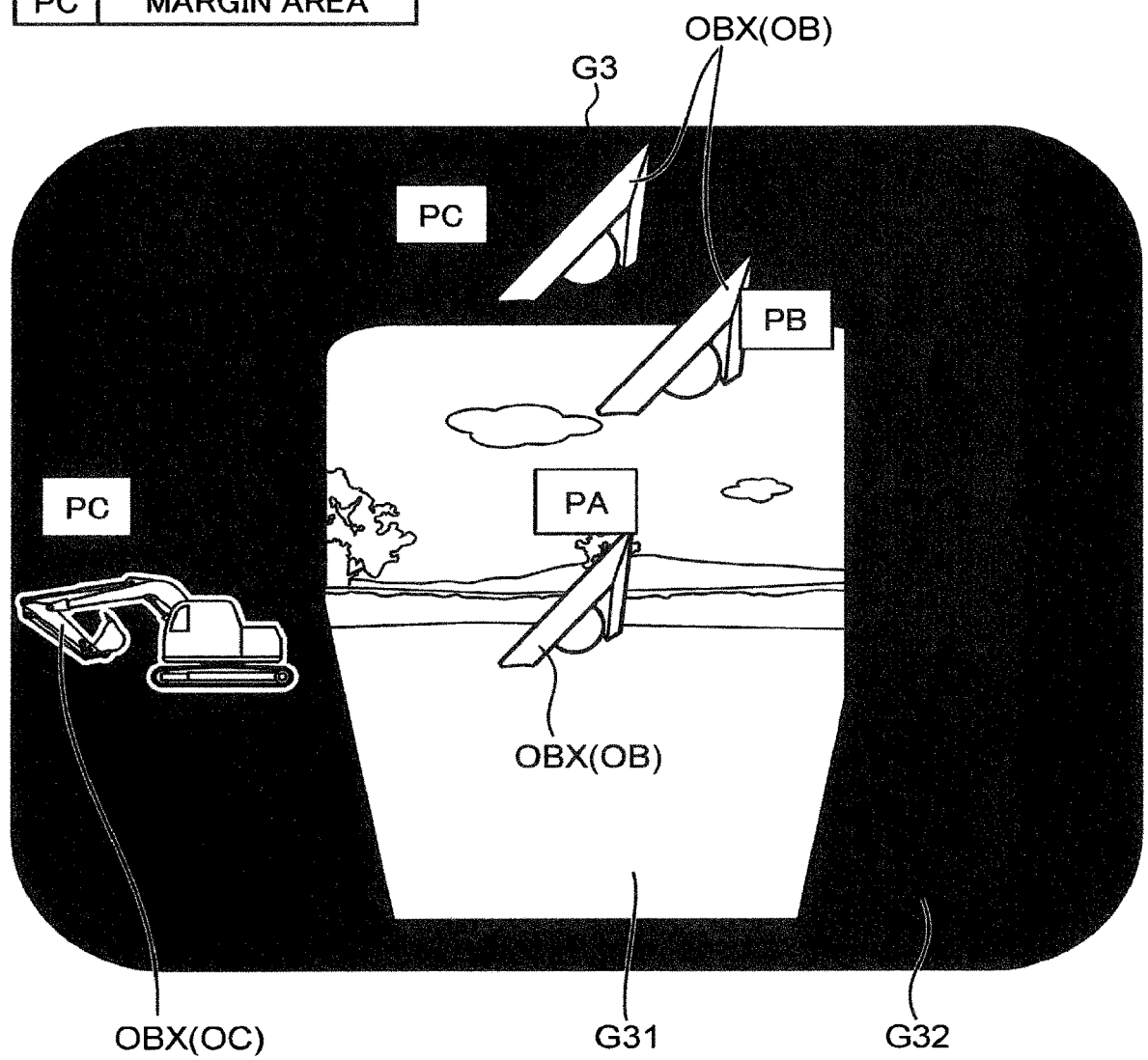
FIG. 4 is a diagram showing a pattern indicating a display position of a display object.

FIG. 4 is a diagram showing a pattern indicating a display position of a display object. A table shown on an upper side of FIG. 4 is a table summarizing patterns of a display position. On the display screen G3 illustrated in FIG. 4, three patterns PA, PB, and PC are shown. The pattern PA is a pattern in which the whole area of a display object OBX is displayed so as to be overlapped with the surrounding image G31. The pattern PB is a pattern in which a part of the display object OBX is displayed so as to be overlapped with the surrounding image G31 and the remainder of the display object OBX is displayed so as to be overlapped with the margin area G32. The pattern PC is a pattern in which the whole area of the display object OBX is displayed so as to be overlapped with the margin area G32.

The display control unit 222 displays the display object OBX in any one of the patterns PA to PC. In the example shown in FIG. 4, there is shown, as the pattern PA, a pattern in which the display object OBX formed of the three-dimensional arrow image OB is displayed at the center of the surrounding image G31. Also, as the pattern PB, there is shown a pattern in which the display object OBX formed of the three-dimensional arrow image OB is displayed on the upper side of the surrounding image G31 so as to have a part of the display object OBX overlapped with the surrounding image G31. Also, as a first pattern PC, there is shown a pattern in which the whole area of the display object OBX formed of the three-dimensional arrow image OB is displayed on the upper side of the margin area G32. Also, as a second pattern PC, there is shown a pattern in which the whole area of the display object OBX formed of the construction machine image OC is displayed on the left side of the margin area G32.

Although in the example shown in FIG. 4, the three-dimensional arrow images OB are used as the patterns PA and PB, and the first pattern PC, this is one example only, and the two-dimensional arrow image OA, the construction machine image OC, or the working device image OD shown in FIG. 3 may be adopted. Additionally, although the construction machine image OC is used as the second pattern PC, the two-dimensional arrow image OA, the three-dimensional arrow image OB, or the working device image OD may be adopted. In a case where the two-dimensional arrow image OA and the three-dimensional arrow image OB are adopted, a coordinate of the local coordinate space Q corresponding to a display position shown in each of the patterns PA to PC is adopted as a coordinate of the reference position O1 shown in FIG. 2.

Additionally, a display position of the display object OBX in the pattern PA is not limited to the center of the surrounding image G31 shown in FIG. 4, but any position can be adopted as long as the position is within the surrounding image G31 and the display object OBX stays within the surrounding image G31. Additionally, a display position of the display object OBX in the pattern PB is not limited to a position extending over an upper edge of the surrounding image G31 shown in FIG. 4, but a position extending over a left edge, a right edge or a lower edge of the surrounding image G31 may be adopted. A display position of the display object OBX in the pattern PC is not limited to the margin area G32 shown on the upper side of FIG. 4, but a margin area on the left side, the right side, or the lower side may be adopted.

FIG. 5 is a table summarizing display/non-display timing of the display object OBX according to the present embodiment. In the present embodiment, the display/non-display timing of the display object OBX has seven patterns. In FIG. 5, "related to display" indicates display/non-display of the display object OBX on the display device 23. "Operation of control lever" indicates whether or not the control lever 24 is being operated by an operator. "Position of working device" indicates whether or not the working device 330 is included in the surrounding image G31. "Elapsed time of non-operation" indicates whether or not a fixed time period or more has elapsed after the stop of operation of the control lever 24. "State of system" indicates whether or not communication connection is established between the slave 10 and the master 20. In the "state of system", "communication start" indicates a state immediately after communication starts between the slave 10 and the master 20. "Decelerating function" indicates whether or not the decelerating function is in operation. "Cutoff lever" indicates whether or not the cutoff lever 25 is locked.

In the pattern "1", in a case where the control lever 24 is being operated, the display control unit 222 will not display the display object OBX irrespective of whether or not the working device 330 is included in the surrounding image G31. This is based on an idea that even when the working device 330 disappears from the surrounding image G31 during operation of the control lever 24, an operator can predict a position of the working device 330 to some extent from the current operation, and displaying the display object OBX conversely hinders the work.

In the pattern "2", in a case where the working device 330 is included in the surrounding image G31, the display control unit 222 will not display the display object OBX. This is based on an idea that in a case where the working device 330 is included in the surrounding image G31, even when the display object OBX is not displayed, an operator can recognize a position of the working device 330.

In the pattern "3", in a case where the working device 330 is not included in the surrounding image G31, the display control unit 222 causes non-display of the display object OBX to continue until a state of non-operation of the control lever 24 is continued for a fixed time period or more.

In the pattern "4", which is a reverse of the pattern "3", in a case where the working device 330 is not included in the surrounding image G31, the display control unit 222 displays the display object OBX after the state of non-operation of the control lever 31 is continued for a fixed time period or more. This is based on an idea of preventing occurrence of chattering, in which display and non-display of the display object OBX are repeated in a short time period, in a scene where the working device 330 repeatedly appear and disappear in a short time period in the surrounding image G31. As a fixed time period, an appropriately set value can be adopted such as 5 seconds, 10 seconds, 30 seconds, 1 minute, and the like.

In the pattern "5", in a case where the working device 330 is not included in the surrounding image G31 at the start of communication between the master 20 and the slave 10, the display control unit 222 displays the display object OBX irrespective of whether or not the control lever 24 is being operated. This is based on an idea of preventing an operator from not being able to recognize a position of the working device 330 in a case where the working device 330 does not appear in the surrounding image G31 at the start of communication.

In the pattern "6", in a case where the cutoff lever 25 is locked and the working device 330 is not included in the surrounding image G31, the display control unit 222 displays the display object OBX irrespective of whether or not the control lever 24 is being operated.

This is based on an idea that in a case where the cutoff lever 25 is locked and work of the working device 330 is suspended, unless the working device 330 is included in the surrounding image G31, it is preferable to display the display object OBX so that an operator can recognize a position of the working device 330.

In the pattern "7", in a case where the decelerating function is in operation and the working device 330 is not included in the surrounding image G31, the display control unit 222 displays the display object OBX irrespective of whether or not the control lever 24 is being operated. This is based on an idea that in a case where the decelerating function is in operation and the work of the working device 330 is suspended, unless the working device 330 is included in the surrounding image G31, it is preferable to display the display object OBX so as to enable an operator to recognize a position of the working device 330.

FIG. 6 is a flow chart showing one example of processing of the remote control system according to the embodiment of the present invention. The flow chart shown in FIG. 6 is repeatedly executed. In S101, the determination unit 221 determines whether or not the working device 330 is included in the surrounding image G31. In a case where the working device 330 is included in the surrounding image G31 (YES in S101), the display control unit 222 does not display the display object OBX on the display screen G3 (S107).

In a case where the working device 330 is not included in the surrounding image G31 (NO in S101), the display control unit 222 determines whether or not the cutoff lever 25 is at the lock position from a detection result of the sensor S2 (S102). In a case where the determination is made that the cutoff lever 25 is at the lock position (YES in S102), the display control unit 222 displays the display object OBX on the display screen G3 (S103). This realizes the pattern "6".

On the other hand, in a case where the determination is made that the cutoff lever 25 is not at the lock position (NO in S102), the display control unit 222 determines whether or not the decelerating function is in operation (S104). In a case where the determination is made that the decelerating function is in operation (YES in S104), the display control unit 222 displays the display object OBX on the display screen G3 (S103). This realizes the pattern "7".

On the other hand, in a case where the determination is made that the decelerating function is not in operation (NO in S104), the display control unit 222 determines whether or not the control lever 24 is being operated from a detection result of the sensor S1 (S105) Here, unless an amount of operation of the control lever 24 detected by the sensor S1 is 0, the display control unit 222 only needs to determine that the control lever 24 is being operated, and when the amount of operation of the control lever 24 detected by the sensor S1 is 0, determine that the control lever 24 is not being operated.

In a case where the control lever 24 is being operated (YES in S105), the display control unit 222 does not display a display object on the display screen G3 (S107). On the other hand, in a case where the control lever 24 is not being operated (NO in S105), the display control unit 222 determines whether or not a fixed time period or more has elapsed from the stop of the operation of the control lever 24 (S106). In a case where a fixed time period or more has elapsed from the stop of the operation of the control lever 24 (YES in S106), the display control unit 222 displays the display object OBX on the display screen G3 (S103). On the other hand, in a case where a fixed time period or more has not elapsed from the stop of the operation of the control lever 24 (NO in S106), the display control unit 222 does not display the display object OBX on the display screen G3 (S107). In a case where the working device 330 disappears from the surrounding image G31 because of NO in S105 YES in S106, and the flow of S103 the display object OBX will be displayed on the display screen G3 after a state where the control lever 24 is not being operated continues for a fixed time period or more. This realizes the patterns "3" and "4".

Additionally, due to YES in S101 and the flow of S107, and YES in S105 and the flow of S107, the display object OBX will not be displayed while the control lever 24 is being operated irrespective of whether or not the working device 330 is present in the surrounding image G31 This realizes the pattern "1" is realized.

In a case of YES in S101, the processing proceeds to S107. This realizes the pattern "2".

FIG. 7 is a flow chart showing one example of processing of the remote control system according to the embodiment of the present invention at the start of communication. In S201, the display control unit 222 of the master 20 determines whether or not communication between the master 20 and the slave 10 has started. Here, the communication is started by, for example, inputting a transmission instruction for a connection request to an input device (not shown) of the master 20 after power of the master 20 is turned on by an operator of the master 20, and transmitting the connection request to the slave 10 by the master 20. Here, the connection request includes identification information of the slave 10 and the like. The slave 10 having received the connection request conducts authentication processing based on the received identification information, and when allowing the authentication, transmits a connection response to the master 20. In this manner, communication connection between the master 20 and the slave 10 is established to start the communication therebetween.

When the communication starts (YES in S201), the processing proceeds to S202 and when the communication does not start (NO in S201), the processing waits in S201.

In S202, the determination unit 221 determines whether or not the working device 330 is included in the surrounding image G31. In a case where the working device 330 is included in the surrounding image G31 (YES in S202), the display control unit 222 does not display the display object OBX on the display screen G3 (S204). On the other hand, in a case where the working device 330 is not included in the surrounding image G31 (NO in S202), the display control unit 222 displays the display object OBX on the display screen G3 (S203). As a result, in a case where the working device 330 is not included in the surrounding image G31 at the start of the communication, the display object OBX is displayed to realize the pattern "5".

Thus, according to the present embodiment, in a case where the working device 330 is not included in the surrounding image G31 of the construction machine 30 captured from inside the cab seat 3C of the construction machine 30, the display object OBX for informing an operator of a position of the working device 330 is displayed on the display screen of the master 20.

Therefore, even when the working device 330 disappears from the surrounding image G31 displayed on the display device 23 of the master 20, it is possible to make an operator of the master 20 recognize a position of the working device 330. As a result, it is possible to allow the operator to securely operate the working device 330, thereby mitigating work labor of the operator.

Additionally, since the flow of FIG. 6 will be repeatedly executed, the display object OBX will be displayed in real time within the display screen G3.

For preventing the working device 330 from disappearing from the surrounding image G31, it is conceivable that an omnidirectional camera is disposed in the cab seat 3C to omnidirectionally capture a surrounding image. This method, however, causes a problem that an increase in a volume of data of a surrounding image causes traffic of communication between a main control device and a slave control device to increase and invites scale-up of a screen of a display device in a master.

According to the present embodiment, even if no omnidirectional camera is disposed, the position of the working device 330 can be notified to an operator when the working device 330 disappears from the surrounding image G31. Therefore, the above problem can be solved.

The present invention can adopt the following modification examples.

(1) In FIG. 4, in a case of adopting the pattern PC in which the display object OBX is displayed in the margin area G32, the display control unit 222 may constantly display the display object OBX irrespective of whether or not the working device 330 is included in the surrounding image G31. In particular, since an operator can have an overview of a posture of the construction machine 30 in a case of adopting the construction machine image OC or the working device image OD as the display object OBX, it is desirable to constantly display the display object OBX.

(2) In FIG. 4, a display mode of combining the pattern PC and the pattern PA may be adopted. The pattern PC is a pattern in which the construction machine image OC or the working device image OD is constantly displayed as the display object OBX in the margin area G32, and the pattern PA is a pattern in which the whole area of the two-dimensional arrow image OA or the three-dimensional arrow image OB is overlapped with the surrounding image G31 so as to be displayed. In this case, it is only necessary to adopt a mode of determining display and non-display of the two-dimensional arrow image OA or three-dimensional arrow image OB according to the patterns "1" to "7" shown in FIG. 5.

The invention claimed is:

1. A remote control system which remotely controls a construction machine including a working device, the remote control system comprising:
    a main control device for remotely controlling the construction machine; and
    a slave control device which is mounted on the construction machine and controls the working device based on operation accepted by the main control device,
    wherein the slave control device includes:
        a camera which acquires a surrounding image obtained by capturing an image of surroundings of the construction machine from inside a cab seat of the construction machine;
        a posture detecting unit which detects a posture of the working device; and
        a first communication unit which transmits to the main control device the surrounding image and posture information indicating the posture of the working device detected by the posture detecting unit, and
    the main control device includes:
        a control member which accepts operation of an operator;
        a second communication unit which receives the surrounding image and the posture information transmitted from the slave control device;
        a display device which displays a display screen including the surrounding image received by the second communication unit;
        a determination unit which determines whether or not the working device is included in the surrounding image received by the second communication unit; and
        a display control unit which, in a case where the determination unit determines that the working device is not included in the surrounding image, calculates a position of the working device from the posture information received by the second communication unit and displays, on the display screen, a display object for informing the operator of the calculated position.

2. The remote control system according to claim 1, wherein the display control unit displays at least a part of the display object so as to be overlapped with the surrounding image.

3. The remote control system according to claim 2, wherein in a case where the determination unit determines that the working device is included in the surrounding image, the display control unit stops displaying of the display object.

4. The remote control system according to claim 2 or 3, wherein in a case where the control member is being operated, the display control unit stops displaying of the display object irrespective of a determination result of the determination unit.

5. The remote control system according to claim 2, wherein in a case where the determination unit determines that the working device is not included in the surrounding image, the display control unit displays the display object after a state of non-operation of the control member is continued for a fixed time period or more.

6. The remote control system according to claim 2, wherein in a case where the determination unit determines that the working device is not included in the surrounding image at a start of communication between the main control device and the slave control device, the display control unit displays the display object irrespective of whether or not the control member is being operated.

7. The remote control system according to claim 2, wherein
    the main control device further includes a cutoff lever which accepts operation from an operator for cutting off operation of the control member, and
    in a case where the cutoff lever is locked and the determination unit determines that the working device is not included in the surrounding image, the display control unit displays the display object irrespective of whether or not the control member is being operated.

8. The remote control system according to claim 2, wherein
    the construction machine is provided with a decelerating function of bringing an engine of the construction machine into an idle state in a case where the control member has not been operated for a fixed time period, and the display control unit displays the display object in a case where the decelerating function is in operation and the determination unit determines that the working device is not included in the surrounding image.

9. The remote control system according to claim 1, wherein the display object is formed of an arrow image three-dimensionally indicating a direction in which the working device is positioned.

10. The remote control system according to claim 9, wherein the display control unit displays the arrow image in a larger size as the position of the working device comes closer to the cab seat.

11. The remote control system according to claim 9, wherein the display control unit directs a front end of the arrow image to a direction obtained by projecting, on the surrounding image, a direction in which the working device is positioned relative to the cab seat.

12. The remote control system according to claim 1, wherein the display object is formed of an arrow image two-dimensionally indicating a direction in which the working device is positioned.

13. The remote control system according to claim 1, wherein the display object is formed of a construction machine image imitating an actual posture of the construction machine in a side view.

14. The remote control system according to claim 1, wherein the display object is formed of a working device image imitating an actual posture of the working device.

15. The remote control system according to claim 1, wherein the display control unit causes the display device to display the surrounding image so that a margin area is included adjacent to the surrounding image and display the display object in the margin area.

16. A main control device in a remote control system for remotely controlling a construction machine including a working device, the main control device comprising:
- a control member which accepts operation of an operator;
- a communication unit which receives a surrounding image obtained by capturing an image of surroundings of the construction machine from a cab seat of the construction machine and posture information indicating a posture of the working device, the surrounding image and the posture information being transmitted from a slave control device communicably connected to the main control device;
- a display device which displays a display screen including the surrounding image received by the communication unit;
- a determination unit which determines whether or not an image of the working device is included in the surrounding image received by the communication unit; and
- a display control unit which, in a case where the determination unit determines that the working device is not included in the surrounding image, calculates a position of the working device in the construction machine from the posture information received by the communication unit and displays, on the display screen, a display object for informing the operator of the calculated position.

* * * * *